United States Patent [19]

Posgate

[11] 4,360,427

[45] Nov. 23, 1982

[54] SUBMERSIBLE WATER CLARIFIERS

[76] Inventor: Edward S. Posgate, 211 Lime Kiln Rd., Ancaster, Ontario, Canada, L9G 3A9

[21] Appl. No.: 251,350

[22] Filed: Apr. 6, 1981

[51] Int. Cl.³ .............................................. B01D 21/01
[52] U.S. Cl. .................................... 210/170; 210/201; 210/208; 210/532.1; 405/74
[58] Field of Search ............... 210/747, 153, 154, 159, 210/170, 199, 200, 201, 207, 532.1, 208; 405/74

[56] References Cited

U.S. PATENT DOCUMENTS

| | | | |
|---|---|---|---|
| 815,722 | 3/1906 | Lydon | 210/154 |
| 1,585,409 | 5/1926 | Myers | 210/170 |
| 2,561,847 | 7/1951 | Danel | 210/154 |
| 2,673,451 | 3/1954 | Gariel | 210/154 |
| 3,817,383 | 6/1974 | Michel et al. | 210/170 |
| 4,133,761 | 1/1979 | Posgate | 210/170 |

*Primary Examiner*—Peter A. Hruskoci
*Attorney, Agent, or Firm*—Fetherstonhaugh & Co.

[57] ABSTRACT

A submersible water clarifier for use in a flowing stream is disclosed which has at least one longitudinally elongated conduit which has an open end which opens in a downstream direction in use and a settling chamber extending inwardly from the open end. The settling chamber has a floor toward which sediment settles in use and the improvement of the present invention is in the provision of a sediment removal passage opening through the floor through which sediment may be removed from the chamber.

3 Claims, 5 Drawing Figures

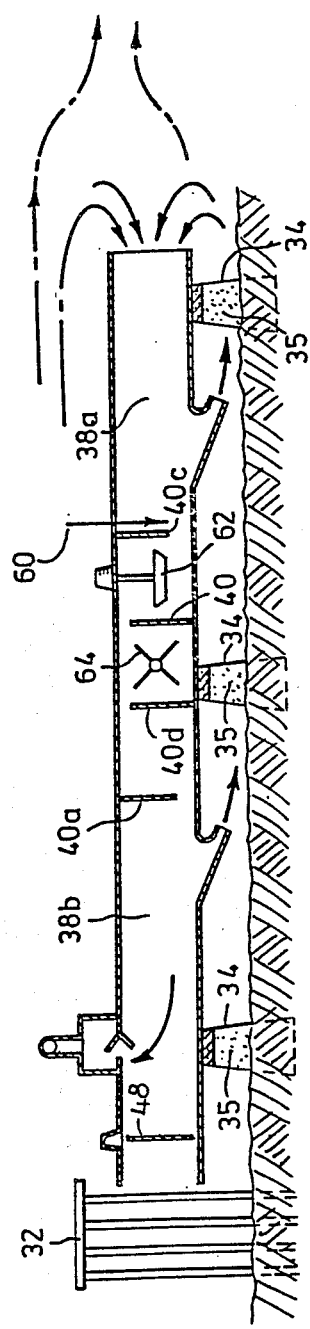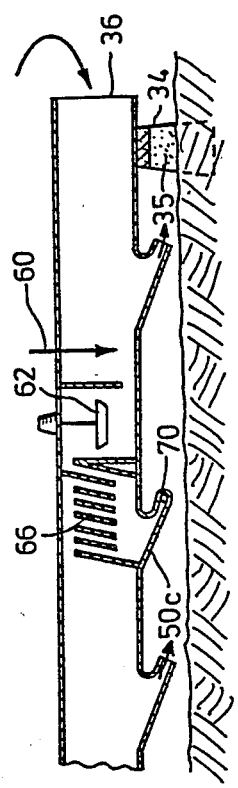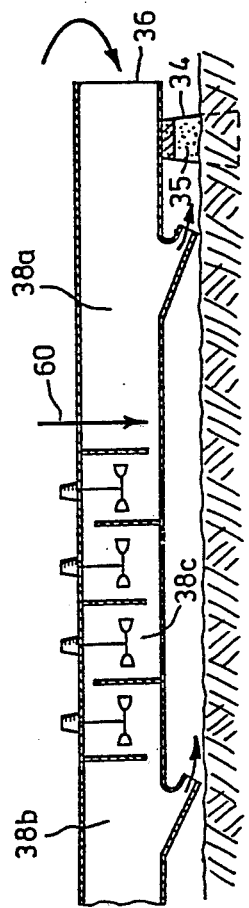
FIG. 3
FIG. 4
FIG. 5

SUBMERSIBLE WATER CLARIFIERS

This invention relates to improvements in submersible water clarifiers for use in flowing streams.

PRIOR ART

In my prior U.S. Pat. No. 4,133,761, I have described a water treatment plant for use in extracting water from a flowing stream of water. In this structure sediment is allowed to accumulate on the floor of a series of longitudinally elongated conduits. Sediment is periodically removed by opening the upstream end of the conduits and allowing the stream to flow through the conduits to remove the accumulated sediment.

The present invention provides an improvement over this prior structure wherein at least a portion of the sediment which is accumulated on the floor of each conduit is continuously extracted from the conduit by the flowing stream. This serves to reduce the frequency with which the conduits must be flushed.

It is, therefore, an object of the present invention to provide an improved water clarifier for use in a flowing stream of water in which at least a portion of the sediment which is accumulated is continuously withdrawn from the settling chamber.

According to one aspect of the present invention, there is provided in a submersible water clarifier for use in a flowing stream which has at least one longitudinally elonged conduit which has an open end which opens in a downstream direction in use, and a settling chamber extending inwardly from the open end, the settling chamber having a floor toward which sediment settles in use, the improvement of a sediment removal passage opening through said floor through which sediment may be removed from said chamber.

According to a further aspect of the present invention, there is provided in a submersible water clarifier as described above the further improvement wherein the sediment removal passage has a discharge orifice opening into the stream in the same direction as the open end of the conduit whereby the flowing stream will serve to extract sediment from the floor of the chamber through the sediment removal passage in use.

PREFERRED EMBODIMENT

The invention will be more clearly understood after reference to the following detailed specification read in conjunction with the drawings, wherein FIG. 1 is a diagrammatic illustration of a water clarification system in which the improvement of the present invention is employed;

FIG. 3 is a sectional side view of a conduit illustrating a further embodiment of the present invention;

FIG. 4 is a sectional side view of a portion of the conduit of FIG. 1 showing a further embodiment of the present invention; and FIG. 5 is a sectional side view of a portion of the conduit of FIG. 1 showing a further embodiment of the present invention.

Figure 1:
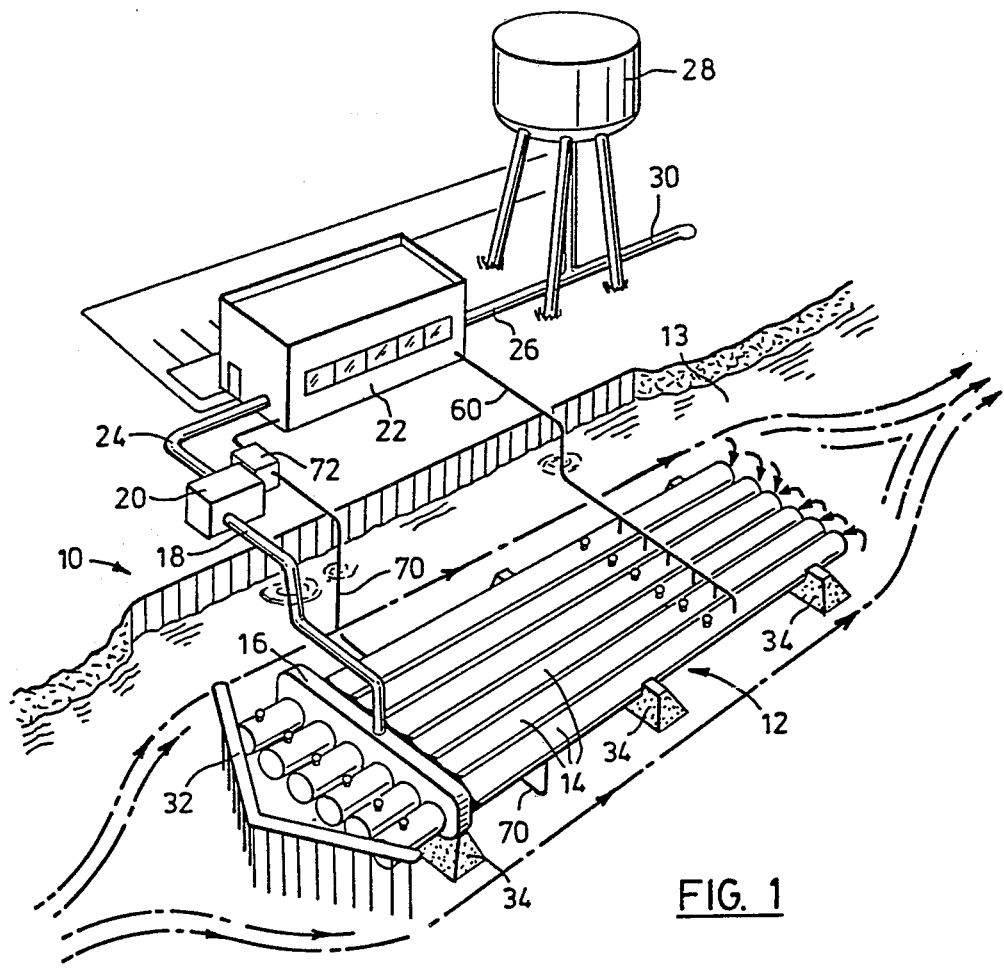

With reference to FIG. 1 of the drawings, numeral 10 refers generally to a water purification system as a whole in which a clarifier 12 is submerged in a stream 13. The clarifier 12 consists of a plurality of conduits 14, each of which has an outlet communicating with a manifold 16. Water is withdrawn from the manifold 16 through a conduit 18 by a pump 20. Water is directed to a purification plant 22 through a conduit 24. Purified water is discharged through conduit 26 to a storage tower 28 and to distribution conduit 30. A barrier 32 is positioned upstream of the clarifier 12 to prevent large floating debris from accumulating at the upper end of the clarifier.

Foundation supports 34 support the conduits 14 in a side-by-side parallel relationship spaced above the river bed.

Figure 2:
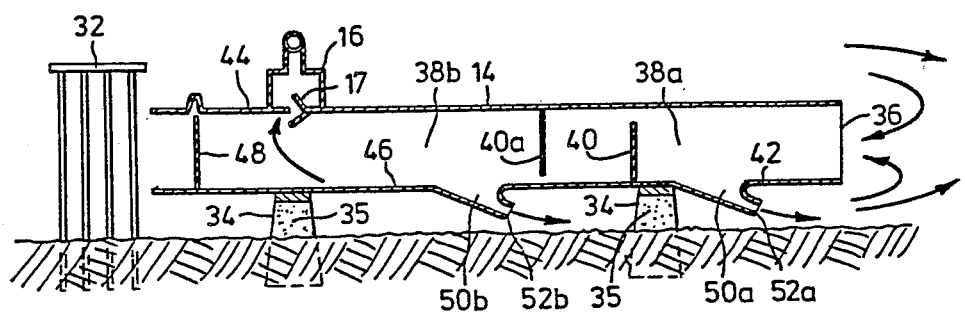
FIG. 2 is a sectional side view of a conduit of FIG. 1.

A conduit 14 constructed in accordance with an embodiment of the present invention is illustrated in cross-section in FIG. 2 wherein it will be seen that it has an open end 36 which opens in a downstream direction. A first settling chamber 38a opens inwardly from the open end 36 and extends to a baffle 40 which extends upwardly from the floor 42 of the first chamber 38a. A second settling chamber 38b extends from the baffle 40 to the upstream end 44. A baffle 40a extends downwardly from the upper end of the second chamber 38b.

The improvement of the present invention lies in the provision of sediment removal passages 50a and 50b which are formed in the floors 42 and 46 respectively of the settling chambers 38a and 38b. The sediment removal passages 50a and 50b have discharge orifices 52a and 52b which open in the same direction as the open end 36 of the conduit 14. Closure plate 48 is located at the upstream end of the conduit 14 and is suitably powered in order to be movable between a closed position closing the upstream end during normal use and an open position opening the upstream end during flushing of the system to remove accumulated sediment.

In use, the clarifier 12 is submerged in the stream of water with the closed end 44 facing upstream and the open end opening in the downstream direction and the longitudinally elongated body of each conduit extending substantially parallel to the direction of flow of the water stream. When the upstream end is closed, water enters the conduits through the open end 36 and is drawn through the first settling compartment 38a and then through the second settling compartment 38b to exit to the manifold 16 by way of a one-way valve 17. The coarse sediment accumulates on the floor 42 of the first settling chamber 38a and the finer sediment accumulates on the floor 46 of the second settling compartment 38b. The conduits 14 are elevated to a sufficient extent to permit the water stream to pass around the sediment removal passages 50a and 50b which are designed to act as eductors at which a negative pressure is generated as a result of the stream flow. The negative pressure causes the sediment which is settled on the floor of each settling chamber to be withdrawn into the stream to be carried downstream from the clarifier. It will be understood that passages 35 are formed in the foundation 34 to permit a substantially uninterrupted flow of the stream below the settling chamber.

FIG. 3 of the drawings illustrates a further embodiment of the present invention wherein flocculation additives are added to the first settling chamber through conduit 60 which are mixed by conventional mixing devices 62 and 64 prior to entering the second settling chamber 38b. Additional baffles 40c and 40d are provided to cause the incoming water to flow in close proximity to the mixing devices 62 and 64.

In FIG. 4 of the drawings, a similar structure is illustrated wherein a tube settler 66 is provided to enhance the efficiency with which clarification is effected and an additional eductor 50c is provided in the floor of the chamber within which the tube settler is located.

FIG. 5 of the drawings illustrates a further embodiment of the present invention in which a high speed mixing chamber 38c is provided between settling chambers 38a and 38b.

In clarifiers where solids are flocculated by polymer addition as described above, it may be desirable to extract the collected solids through each of the eductors 52 and convey the solids to the shore bases installation 22 through a conduit 70 (FIGS. 1 and 4). This form of the apparatus is to be used when the solids which are removed are not suitable for discharge into the stream. In this form of the apparatus, an extraction pump 72 is provided for extracting the fluid through the eductor 52 in view of the fact that they are not exposed to the stream of water.

From the foregoing it will be apparent that the provision of sediment removal passages opening through the floor of each settling compartment of each longitudinally elongated conduit serves to reduce the frequency with which complete flushing of each conduit need be performed.

These and other advantages will be apparent to those skilled in the art.

The embodiments of the invention in which exclusive property or privilege is claimed are defined as follows:

1. In a submersible water clarifier for use in the flowing stream, said clarifier having at least one longitudinally elongated conduit which has an upstream end and a downstream end, means for opening and closing the upstream end of each conduit, the downstream end of each conduit being opened, a settling chamber extending inwardly from the downstream end, the settling chamber having a floor toward which sediment settles and an upper portion in which clarified water accumulate in use, the improvement comprising a sediment removal passage opening through said floor, foundation means for supporting each of said elongated conduits above the bed of a stream to permit substantially uninterrupted flow of stream water below the settling chamber in the downstream direction, said sediment removal passage having a discharge orifice opening in said downstream direction through which the sediment will be extracted from the floor of said chamber by the negative pressure generated by the stream water passing by the discharge orifice in use, and outlet passage means in the upper part of each conduit through which clarified water is withdrawn.

2. A submersible water clarifier as claimed in claim 1 wherein each of said conduits has at least one baffle located in said chamber and dividing said chamber into at least two serially connected settling compartments, each of said settling compartments having a sediment removal passage opening through said floor.

3. A submersible water clarifier as claimed in claim 1 wherein each of said conduits has a plurality of longitudinally spaced transversely extending baffles forming a first settling compartment opening inwardly from said open end a mixing compartment communicating with said first settling compartment and a second settling compartment communicating with said mixing compartment, each of said settling compartments having a sediment removal passage opening through its floor, said mixing compartment having means for admitting additives therethrough and mixing means in said mixing compartment for mixing said additives with the water contained therein.

* * * * *